United States Patent [19]

Jacobson

[11] 3,827,165

[45] Aug. 6, 1974

[54] TEST SCORING APPARATUS

[76] Inventor: Robert Jacobson, 725 W. Brompton, Chicago, Ill. 60657

[22] Filed: June 21, 1973

[21] Appl. No.: 372,009

[52] U.S. Cl. ............................................. 35/48 A
[51] Int. Cl. ........................................... G09b 3/00
[58] Field of Search ................. 35/48 R, 48 A, 48 B

[56] References Cited
UNITED STATES PATENTS

| | | | |
|---|---|---|---|
| 1,163,184 | 12/1915 | Thompson | 35/48 A |
| 2,080,150 | 5/1937 | Peterson et al. | 35/48 A |
| 3,266,049 | 8/1966 | Parmenter | 35/48 A |
| 3,606,690 | 9/1971 | Murray | 35/48 A |

Primary Examiner—J. H. Wolff

[57] ABSTRACT

A test scoring apparatus embodying a printed student's answer sheet and a printed teacher's template forming blank. The answer sheet, when properly pencil-marked by the student in response to a questionnaire, and the template blank, when similarly pencil-marked by the teacher and provided with sight holes and sight windows in response to the same questionnaire, constitute counterpart members which, when superimposed, enable the teacher to make both side-by-side comparisons for grading fill-in type questions, and sight hole disclosures for grading true-false and multiple choice type questions.

5 Claims, 5 Drawing Figures

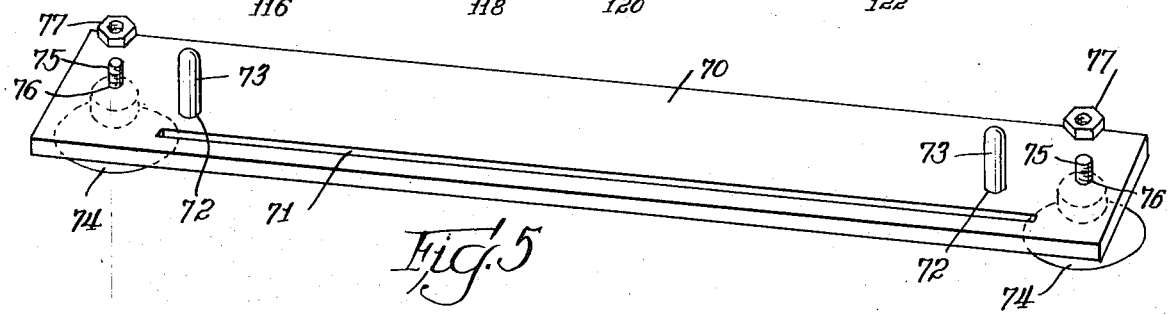

TEST SCORING APPARATUS

The present invention relates to test scoring apparatus and has particular reference to a novel system and apparatus by means of which an educational test may be given to a number of students simultaneously and the results of such test ascertained by a teacher with a minimum of paper work or other effort. (Student meaning anyone taking a test which employs true-false, matching, multiple choice, or fill in questions; teacher meaning anyone administering above mentioned type test.)

The invention is primarily concerned with education at the grade school and high school level where written examinations are frequently based in their entirety upon such well known concepts as true-false, matching, multiple choice, and word fill in types of questions. In the case of true-false and/or multiple choice the student's answer to any given question is rendered by the simple expedient of pencil-checking a predetermined space on his answer sheet, whereas with matching and/or fill-in questions it is necessary for the student to write a symbol, word, or a short composite of words, at a given location on the sheet.

For the presentation of this type of an examination to students, there are available from various publishing houses prepared examinations covering a wide variety of subjects such as mathematics, grammar, geography, science, music, art and many other school subjects. Specific answer sheets in combination with specific templates to assist the teacher in grading these examinations by means of a side by side comparison of answer sheet and template are rarely furnished by the test publishers. Even the use of such commercial examination sheets and templates as exist is not altogether satisfactory inasmuch as such sheets and templates are prepared by professional educators and on a specific basis so that the individual and current requirements of a particular teacher and class are seldom met. For example, the educational patterns of various teachers vary widely and are dependent upon such factors as the particular teacher's background and training, the specific text book which is being used by the class, changes in political or economic situations, current events whether national or local, etc. Therefore, where commercial examination sheets and templates are used, it is seldom that a given teacher is able to select a commercial examination sheet which does not contain questions which are foreign to current classroom experience, or which emphasizes an important point or subject which has recently been under discussion in the class room. Additionally, commercial examination sheets vary widely in their presentation of subject matter so that for each set of sheets an individual template is supplied. Where a composite examination embodying true-false, matching, multiple choice, fill-in and other types of questions are concerned, multiple templates are sometimes furnished and much manipulation on the part of the teacher is required in selecting the proper templates for grading the different types of questions. Finally, no template-answer sheet system to facilitate the grading of examinations employing true-false, multiple choice, matching and fill-in questions is available to the teacher who originates his own test.

The present invention is designed to overcome the above-noted limitations that are attendant upon the construction and use of present day commercial examination sheets and templates and, toward this end, the invention contemplates the provision of a novel apparatus which consists largely of paper sheet material and by means of which an examination may be given to a group of students, and the proficiency of the students in answering the questions involved in the examination quickly and easily determined.

In carrying out the invention it is contemplated that a set of duplicate student's answer sheets shall be furnished the class, such sheets being prepared according to the invention by the teacher and in accordance with a set of test questions which may be presented to the class by a printed questionnaire, a blackboard disclosure, or an oral question announcement, the method of conveying the particular examination questions to the students constituting no part of the present invention. In addition to the answer sheets, the invention further contemplates the provision of a teacher-prepared scoring template which is designed for use in scoring or grading the student's answerrs to the examination at the time that the answer sheets are returned to the teacher for grading purposes. This template is preferably in the form of a sheet of an inexpensive grade or quality of paper and it may be prepared by the simple expedient of punching various sight holes in the paper with the use of a conventional paper punch, slitting or cutting various sight windows with a razor blade, and performing a few pencil fill-ins. (Sight holes meaning relatively small spaces which have been cut out of a template for the purpose of revealing specific small spaces on the answer sheet when template and answer sheet are in register; whereas sight windows meaning relatively large spaces which have been cut out of a template for the purpose of revealing specific relatively large areas on the answer sheet when answer sheet and template are in register.)

Bearing in mind that, as previously set forth, the present test scoring apparatus is essentially concerned with mark-in or write-in answers to questions of the true-false, matching, multiple choice and word fill-in variety, the novelty of the present invention consists of a particular arrangement of answer reply spaces on the student's answer sheet, together with a particular arrangement of comparison spaces on the teacher's template whereby, when the template is superimposed upon a given answer sheet in proper or operative register therewith, an immediate indication of the correctness or incorrectness of each answer will readily be apparent, while at the same time a large number of umarked or improperly marked answer spaces on the student's answer sheet, with which the teacher has no interest or concern, will be blocked by the template from view so that the usual "answer-hunting" which is involved with conventional student's answer sheets is eliminated. The provision of a test scoring apparatus such as has briefly been outlined above constitutes the principal object of the present invention.

In carrying out this object, the invention contemplates the provision of a test scoring apparatus embodying a set of printed duplicate student's answer sheets which are of novel standardized columnar construction, each sheet having a first dividing main column which will accomodate answers relating to simple true-false questions alone (simple true-false questions meaning questions which are answered by indicia indicating that a statement is either true or false), and/or compound true-false questions (compound true-false questions meaning questions requiring the substitution of a word or a word composite for an indicated word or word composite in a false statement, in order to make the false statement true or correct;) a second main column which will accomodate word matching type answers; a third main couple which will accomodate multiple choice type answers; and a fourth main column which will accomodate word fill-in type questions alone. For use with such columnar answer sheets the invention provides a scoring template which likewise is of columnar construction and which has four main columns which correspond in function to those of the answer sheet and which, when the template is properly superimposed on the answer sheet, variously overlie, or lie adjacent the corresponding columns of the answer sheet. Such columns or subcolumns of the template as overlie corresponding columns or subcolumns of the answer sheet are intended to be pre-punched by the teacher to provide sight-holes through which correct or incorrect answers marked on the answer sheet and relating to either true-false or multiple choice type questions may be viewed, while at the same time non-relevant answer marks on the answer sheet are blocked from view. Such columns or subcolumns of the template as lie adjacent to corresponding columns or subcolumns on the answer sheet, and which relate to fill-in or matchin type questions, afford a ready comparison of the correcteness or incorrectness of answers due to the fact that the template column is previously marked by the teacher with the correct write in words or symbols.

The provision of a test scoring apparatus which is extremely simple in its physical construction, consisting as it does solely of printed paper sheets and an accompanying paper template blank (template blank meaning imprinted form with visibly defined punchout and/or cutout and/or slit out area, and visibly defined areas for receiving indicia signifying correct answers to test questions, whereas template meaning a template blank which has been processed by punching out and/or cutting out and/or slitting the necessary areas and by pencil marking the necessary parts) and which may therefore be manufactured at a low cost; one in which color differentials may be involved to the extent that the template is printed on a colored sheet to aid in contrasting student and teacher responses but which nevertheless allows all printing to be done in one color, thereby contributing to economy of manufacture; one wherein an ordinary pencil and a conventional paper punch with a ⅞ inch reach and a razor blade or simple cutting tool are the only tools required for template preparation and wherein a pencil is all that is required by a student in preparing his answer sheet; one wherein template and answer sheet registry during actual test scoring operations may, if desired, be attained without the use of edge guides, measuring apparatus, paper clamps or the like; one wherein standardized answer sheets and associated templates will accommodate a few or a large number of test answers without modification of either the template or answer sheets; one which requires no unusual degree of intelligence or skill on the part of a student in readily understanding the functions he is to perform in properly answering the test questions, or on the part of the teacher in grading the answer sheets; and one which otherwise is well adapted to perform the services required of it, are further desirable features which have been borne in mind in the production and development of the present invention.

Other objects and advantages of the invention, not at this time enumerated, will readily suggest themselves as the nature of the invention is better understood.

In the accompanying drawings forming a part of this specification, one illustrative embodiment of the invention has been shown by way of example rather than limitation.

In these drawings:

FIG. 1 is a fragmentary plan view of a student's blank answer sheet embodying the principles of the present invention;

FIG. 2 is a fragmentary plan view of a teacher's template blank which is usable in connection with the answer sheets of FIG. 1;

FIG. 3 is a fragmentary plan view of one of the answer sheets of FIG. 1, showing the same properly filled in or executed by a student in response to a particular test or examination; and FIG. 4 is a fragmentary plan eiew of a completed teacher's template which has been constructed from the tempalte blank of FIG. 2, showing the same properly prepared for grading of the answer sheet of FIG. 3.

FIG. 5 is an isometric view of an alignment and securing rack for the answer sheet and grading template.

Figures 1, 3:
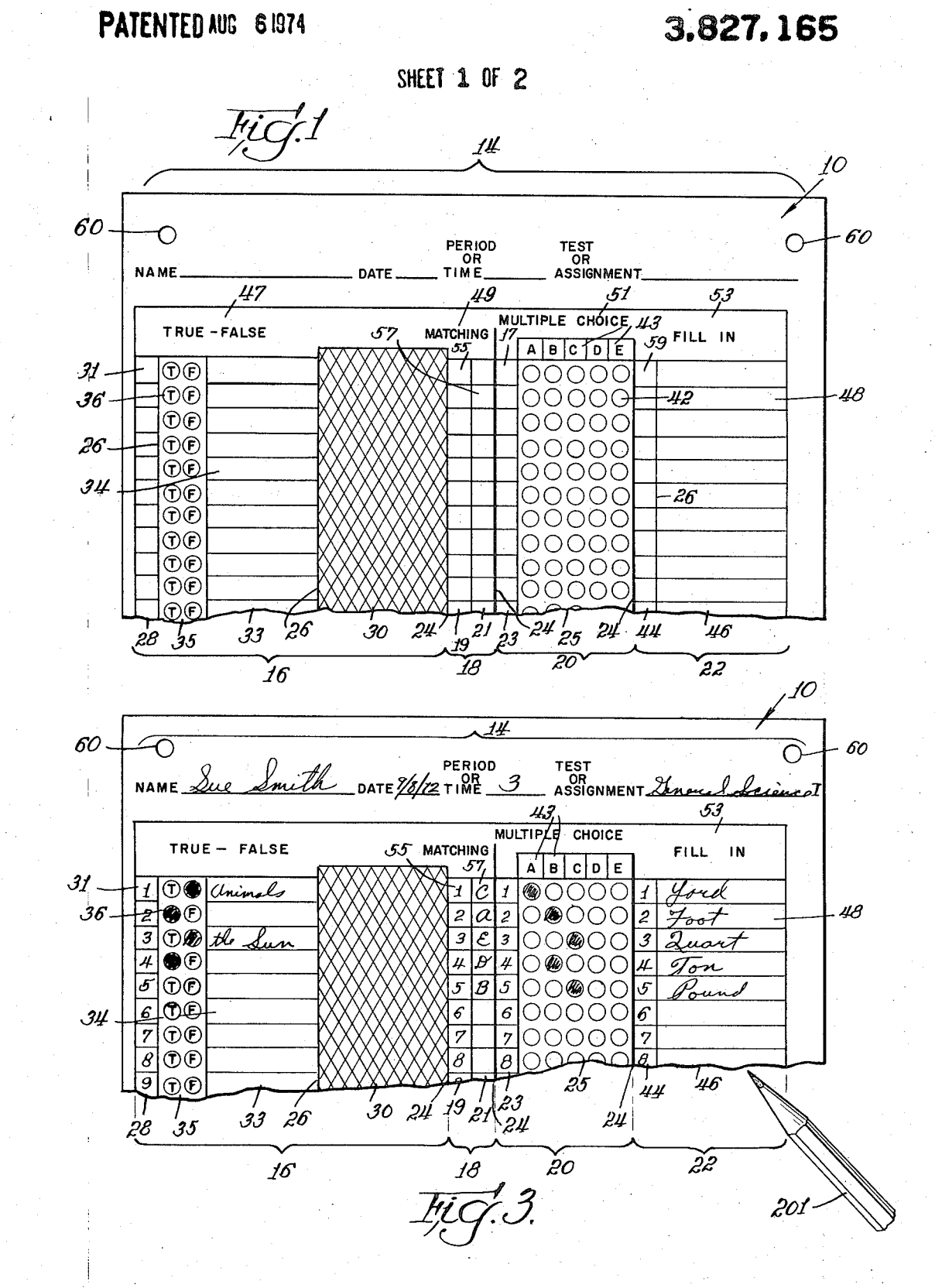

Referring now to the drawings in detail, the test scoring apparatus of the present invention consists of but two component parts, namely a printed student's answer sheet 10, one of which is shown in FIG. 1, and a printed teacher's template blank 12 which is illustrated in FIG. 2 and which is useable in a manner that will be made clear presently in connection with the answer sheet 10. The set of answer sheets may be in the form of a stack of loose paper sheets, or of a glued pad of such sheets. It will be understood, of course, that one such sheet 10 will be furnished by the teacher to each student with instructions that he fill in or execute the same in conformity with a series of questions submitted to the class for examination purposes. The manner in which the examination questions are transmitted to the student forms no part of the present invention, the questions usually being presented to the student by a written examination sheet or sheets, by writing them on a blackboard for the benefit of the entire class, or by oral presentation thereof at periodic intervals during a given examination period. Irrespective however of the particular method of conveying examination material to the student, the essential features of the invention are in no way altered.

The present invention is concerned essentially with the test scoring of responses which are made to questions which are based on such concepts as true-false, matching, multiple choice and fill-in type questions, these concepts being well developed from the time of antiquity so that they need no explanation herein. Accordingly, the student's answer sheet 10 is provided with an upper horizontal marginal space 14 which may contain the usual printed data relating to student identification, class, date, etc. The main body of the sheet 10 is divided into four main vertical columns including a first composite column 16, a second composite column 18, a third composite column 20, and a fourth composite column 22. The various adjacent columns are readily distinguishable from each other by relatively heavy vertical lines 24. The supracolumnar spaces 47, 49, 51, and 53 are for labelling the main columns 16, 18, 20, and 22 respectively.

The column 16 is designed for student response to examination questions of the true-false type, the column being appropriately labelled in FIG. 1 by the use of brackets. This column is sub-divided by light vertical lines 26 into four sub-columns, namely a left hand sub-column 28, a right hand sub-column 30, a left medial sub-column 35 and a right medial sub-column 33. The sub-column 33 is divided into horizontal rectangular spaces 34. The sub-column 35 contains a series of vertically spaced pairs of circles, each pair including a circle labelled "t" and a counterpart circle labelled "f," as is customary in connection with conventional answer sheets relating to true-false questions. The right column 30 is a non functional sub-column (non functional sub-column meaning a subcolumn intended to not receive indicia and it is denoted by absence of printing or by imprint of a pattern unrelated to function of the form; whereas functional subcolumn meaning a sub-column for receiving either answer indicating indicia or other indicia related to a test question, such as the question number). The left subcolumn 28 is divided into a vertical series of squares 31.

The main column 18 is designed for student response to examination questions of the matching type as labelled in FIG. 1 and this column is divided vertically by a vertical line 26 into two sub-columns of equal size 19 and 21. These two sub-columns are further divided into pairs of adjacent squares by parallel vertical lines across the entire width of column 18.

The main column 20 is designed for student response to examination questions of the multiple choice type as likewise labelled in FIG. 1. This column is divided into two sub-columns 23 and 25. Sub-column 23 consists of a vertical row of stacked squares 17 for the purpose of numbering the answer sheet to correspond with the examination questions. Sub-column 25 contains plural series of vertically spaced horizontal rows of circles 42, there being five such circles in each row so as to represent five possible choices in the answering of any given examination question. It will be understood of course that a greater or lesser number of such circles 42 in each row may be employed if desired. At the top of sub-column 25 are five answer selection indicia boxes 43 for the purpose of labelling the circles 42 to correspond with the answer selection indicia of the examination question. Each box labels the vertical row of circles beneath it.

The main column 22 which is designed for students responses to fill-in questions is divided by a light vertical line 26 into a left hand sub-column 44 which is divided into squares for numbering the answers and a right hand sub-column 46 which is divided into rectangular spaces 48.

For a proper understanding of the function of the various main columns and sub-columns set forth above, it is deemed expedient to describe the individual column functions by reference to the pertinent portions of an exemplary examination or questionnaire submitted to the student with his answer sheet 10.

Considering first the composite main column 16, this column is entirely suitable for answering either a simple true-false question or a compound true-false question where the true-false statement contains an underlined word which, if false must be made true by insertion of another word in the column. Thus sub-column 28 is for numbering the answers to correspond with the examination questions. The sub-column 35 is suitable for reply to a simple true-false statement, while the sub-column 33 is suitable for the proper fill-in word which will make a false statement become true.

In FIG. 3 the student's answer sheet 10 is shown as having been partially executed by a student in response to an examination in which the true-false questionaire portion thereof is based on the following exemplary true-false statements:

1. Cows are plants
2. Fish live in water
3. The earth revolves about Mars
4. Rocks are hard
5. Astronomers study the stars In the student's answer sheet 10 of FIG. 1, provision may be made for a large number of questions of each type. However only five true-false questions are involved in the exemplary questionnaire set forth above, and thus only five horizontal areas, which are labelled 1 to 5 inclusive, in the sub-column 28 are shown as having been executed in the student's answer sheet 10 as illustrated in FIG. 3. In regard to the two false statements, namely questions Nos. 1 and 3, the circles 36 labelled "f" in the sub-column 35 have been darkened by the student with the use of a pencil while the corrective words "animals" and the "the sun" have been properly written in the spaces 34 of the sub-column 33. In regard to the three true statements, namely questions Nos. 2, 4 and 5, the circle 36 labelled "t" in the sub-column 35 have been darkened. The sub-column 30 requires no attention on the part of the student, it being a non functional sub-column existing for template placement as will become clear subsequently (template placement meaning the registration of template and answer sheet in such a manner as to make possible an immediate visual comparison between student's answers and teacher's answers.)

Considering now the column 18 of the student's answer sheet 10 which relates to examination questions of the matching type, this column is shown in FIG. 3 as having been properly executed in response to directions that numbered words shall be matched with opposed lettered words, and also that the appropriate letters be entered in the squares 57 of sub-column 21. Execution of this column is made on the basis of a questionnaire such as the following:

| | |
|---|---|
| 1. Stars | A. Flower |
| 2. Tulips | B. Animal |
| 3. Iron | C. Heavenly bodies |
| 4. Leprosy | D. Disease |
| 5. Leopard | E. Element |

As shown in the column 18, the squares 57 have entered therein the designations, C, A, E, D, and B successively and in the order named. Sub-column 19 which is divided into a vertical series of stacked squares 31 is for numbering the answers to correspond with the examination questions.

Similarly, considering the column 20 of the student answer sheet 10 which relates to examination questions of the multiple choice type, in FIG. 3 this column has been divided into sub-columns 23 and 25. Sub-column 23 is used for numbering the answers. Above sub-column 25 are five answer selection indicia boxes 43 labelled A – B – C – D – E respectively. Each box has the effect of labelling the entire vertical row of circles beneath it. Sub-column 25 has been properly executed in response to a questionnaire such as the following:

1. Diamonds are (A) hard; (B) soft; (C) liquid; (D) gas
2. At room temperature mercury is (A) solid; (B) liquid; (C) gas; (D) none of these
3. Water is (A) an element; (B) a mixture; (C) a compound
4. Air is (A) an element; (B) a mixture; (C) a compound
5. A dog is (A) a feline; (B) a bovine; (C) an equine; (D) a rodent In the student's properly executed answer sheet as shown in FIG. 3, the correct answer to the five questions have been indicated by a darkening of the circle 42 labelled A, B, C, B and C successively and in the order named.

In connection with the column 22 of the student's answer sheet 10 which relates to questions of the fill-in type, the entries which are properly made in FIG. 3 in the various rectangular spaces 48 of such column are conformable to a questionnaire such as the following:

1. Three feet equal one       .
2. Twelve inches equal one    .
3. Two pints equal one        .
4. 2,000 pounds equal one     .
5. Sixteen ounces equal one   .

Subcolumn 44 is used to number the answers.

Referring now to FIG. 2, wherein the teacher's template blank 12 is illustrated, this blank is in the form of a printed paper sheet which is, in general, patterned along the same lines as the student's answer sheet 10 in that it is comprised of the same number of main columns and that such columns in a general way correspond functionally to the columns of the answer sheet. For convenience of description, and in order to avoid needless repetition of description, similar reference numerals but of a higher order have been applied to the corresponding printed material on the tempalte blank 12, as well as to certain corresponding fill-in spaces or areas as between the disclosures of FIGS. 1 and 2.

Considering particularly the differences which exist between the teacher's template blank 12 and the student's answer sheet 10, an important difference, having particular regard to the specific embodiment being described, resides in the fact that the former sheet is appreciably wider than the latter sheet. This difference in width is a result of template column 122 being longer than answer sheet column 22 by the length of sub-column 163. A second major point of difference between template blank 12 and answer sheet 10 resides in the fact that column 118 of the template blank has three sub-columns whereas the corresponding column 18 of the answer sheet has only two sub-columns. Column 118 is wider than column 18 by the width of sub-column 161. A third major point of difference between the template blank 12 and answer sheet 10 resides in the reversed positions of sub-columns 130 and 133 of the template relative to sub-columns 30 and 33 of the answer sheet. A fourth major difference between the template blank 12 and the answer sheet 10 resides in the fact that only the template blank 12 contains printed directions instructing the teacher to cut out nonfunctional sub-columns 130, 161 and 163 and to slit along line 127 which separates column 120 from column 122. Or alternatively, sub-columns 130, 161 and 163 may be die cut and/or removed and the slit along line 127 may be die cut as part of the manufacture of the template blank. The purposes of these directions, or method of manufacture, are twofold: the first reason is template placement as will become clear subsequently; the second reason is, within this particular embodiment, to allow an ordinary paper punch with a ⅞ inch reach to be able to reach any circle 142 of the template blank 12 after the proper cutting and slitting directions have been performed.

In FIG. 4, the completed template which is prepared by the teacher from the above-described template blank 12 is illustrated and designated in its entirety at 12'. Inasmuch as the template 12' is, in fact, the template blank 12, but with certain cut-outs made therein, identical reference numerals have been applied to the corresponding printed material on the sheet as between the disclosures of FIG. 2 and 4.

Considering again the questionnaires which resulted in the correctly executed student's answer sheet 10, the teacher in preparing the template T from the template blank 12 will regard the template blank as though it were, in fact, an answer sheet and as a result the areas on the template blank 12 which correspond to the student-marked areas on the student's answer sheet 10 will be operated upon by the teacher. However, in the case of the true-false sub-column 135 of the blank 12, instead of darkening the appropriate circles 136, these circles will be punched out by the use of a suitable conventional punch such as is shown in FIG. 4 and designated by the reference numeral 200. Answers to compound true-false questions will be written by the teacher in spaces 134. Non functional sub-column 130 will be cut out. Thus the punched holes in sub-column 135 of the template will correspond to the darkened circles in the sub-column 35 of the answer sheet. Likewise the written answers in spaces 134 of the template will correspond to the written answers in spaces 34 of the answer sheet. Sub-column 128 is numbered to correspond to the true-false questions in the examination and agrees with sub-column 28 of the answer sheet. In the case of the matching column 118, sub-column 161 will be cut out while the vertical row of squares 157 of sub-column 121 will have written therein indicia corresponding precisely to the correct answer in the questionnaire. Then, in both the student's answer sheet 10 and the template T, the single vertical row of squares 57 of the answer sheet will agree precisely with the right hand row of squares 157 in the column 118 of the template. Sub-column 119 is numbered to correspond with the matching questions of the examination and agrees with sub-column 19 of the answer sheet.

In the case of the multiple choice column 120 of the template 12', the teacher in preparing the template will refer to the appropriate questionnaire and punch out the circles 142 accordingly, the net result of this procedure being to produce sight holes in the column 120 which correspond positionally to the darkened circles 42 in the column 20 of the student's answer sheet. Sub-column 123 is numbered to correspond with the matching questions of the examination and it agrees with sub-column 23 of the answer sheet.

Finally, to complete the preparation of the template T, reference to the appropriate questionnaire relating to fill-in questions will enable the teacher to fill in the spaces 148 of the column 122 with the same words which appear in the spaces 48 of column 22 and which represent correct fill-in answers to the questionnaire. Sub-column 163 will be cut out. Sub-column 144 is numbered to correspond to the fill-in questions of the examination and it agrees with sub-column 44 of the answer sheet.

Upon completion of the template T, it will be preserved by the teacher for use in a manner that will be set forth presently in connection with the scoring or grading of the various student's answer sheets 10.

In the use of the completed teacher-prepared template 12', this template will be placed and centered transversely upon the somewhat narrower student's answer sheet 10 which is to be graded and with the two sheets being disposed in longitudinal register and the horizontal rows of written information also being in register transversely across the superimposed sheets. Placement of the template T upon the student's answer sheet 10 in this manner is facilitated by the two black alignment dots or apertures 160 of the template 12'. (Alignment dots meaning visibly defined areas on the template and answer sheet which when superimposed cause the template and answer sheet to come into register.) When these dots are registered with the alignment dots or apertures 60 of the answer sheet 10 then the template will overlie the answer sheet in such a manner that:

1. In the case of the two true-false sub-columns 35 and 135, when the template is properly positioned on the answer sheet, these two sub-columns will exist in accurate register so that, where a properly executed answer sheet is concerned each punched out circle 136 or sight hole in the template will reveal a pencil darkened circle 36 on the answer sheet therebeneath. Furthermore the unpunched circles in the column 130 of the template 12' will block off viewing of the "*t*" or "*f*" designation therebeneath and thus lessen any chance of visual misinterpretation on the part of the teacher when considering the subcolumn 35. It will be understood of course that in case of an incorrectly marked answer sheet 10 one or more punched out circles 136 in the sub-column 30 will fail to reveal a darkened area, thus giving an immediate indication of an incorrect answer or answers. Furthermore sub-column 33 of the answer sheet will be in exact register under sub-column 130 of the template. If the latter sub-column is cut out the sight window created will cause sub-column 33 of the answer sheet to lie alongside sub-column 133 of the template for ready and rapid comparison of the information contained in these two compound true-false sub-columns (33 and 133.)

2. Sub-column 21 of the answer sheet will be in register under sub-column 161 of the template. If the latter sub-column is cut out the sight window created will cause sub-column 21 of the answer sheet to lie alongside sub-column 121 of the template. The vertical row of letter designations in the squares 57 of the answer sheet will appear adjacent to the letter designations in the squares 157 of the template and the pairs of letter designations can thus easily and rapidly be compared.

3. Similarly, with the template 12' properly positioned on the answer sheet 10, the multiple choice columns 25 and 125 will coincide and, with a properly executed answer sheet, only darkened circles will be visible through the sight holes established by the punched out circles 142 of the template sub-columns 125. Any sight holes which do not reveal darkened areas will indicate an incorrect answer to one of the questions of the multiple choice questionnaire.

4. Sub-column 46 of the answer sheet will be in register under sub-column 163 of the template. If the latter sub-column is cut-out the sight window created will cause sub-column 46 of the answer sheet to lie alongside sub-column 146 of the template for rapid comparison of the fill in information in these two sub-columns (46 and 146.)

From the above description it is believed that the nature and many inherent advantages of the herein disclosed test scoring apparatus will be fully appreciated. It will be understood that the various questionnaires set forth herein by way of example are ordinarily component parts of a complete test examination which is submitted to the student by way of a printed examination sheet or sheets. In the interest of clarity, these questionnaires have been individually selected for treatment at points in the description where their relation to a given answer sheet column is undergoing discussion. Furthermore, in an effort to facilitate an understanding of the manner in which the teacher and student attend to their answer sheet and template during respective preparation thereof, the positional representation of a pencil 201 in FIG. 3 indicates that such pencil is the only tool which is required by the student in executing the answer sheet 10. In FIG. 4 the positional pencil representation indicates that during the teacher's preparation of the template T the sub-column 128 and 146 may be attended to by the use of a pencil, while the disclosure of the punch 200 in this view indicates that all of the punched out circles 136 and 142 are established by the use of the paper punch 200. The disclosure of the razor blade 202 in FIG. 4 indicates that all cutting and slitting necessary to complete the template may be performed with the razor blade if said cutting and slitting were not previously done in the manufacture of the template blank 12.

The invention is not to be limited to the exact arrangement of parts shown in the accompanying drawings or described in this specification as various changes in the particular lay out of the students answer sheet 10 or the teacher's template blank 12 may be resorted to without departing from the spirit of the invention. For example, whereas the template blank 12 disclosed herein is shown as being wider than the answer sheet 10 due to the addition in the template blank 12 of the nonfunctional sub-column 163, it is within the scope of the invention to construct the answer sheet with such nonfunctional sub-columns and to omit them in the template so that such latter sheet will be narrower than the answer sheet. In either event, the desired adjacent positioning of the various fill-in sub-columns 33 and 46 of the answer sheet with respect to the columns 133 and 146 of the template 121 will take place when the template and answer sheet are superimposed for grading purposes. Further, columns 135 and 125 of the template 12' need not be disposed in the particular order shown in the described embodiment, but it is essential that these columns be disposed either adjacent an edge of the template, adjacent a sight window in the template or adjacent a slit in the template, so as to allow access by an insertion of the conventional paper punch with the ⅞ inch reach. Since alignment of the template and answer sheets is vital to proper use of this invention, a mechanical rack may be used, and such alignment and securing rack is illustrated in FIG. 5. The rack consists of a rectangle 70 made of rigid material, two removable round pegs 73 of rigid material, and one or more removable suction cups 74 or equivalent magnets or holding pads. The plastic rectangle 70 contains a thin interstitial slit 71 through its entire depth and two apertures 72 whose distance apart is exactly the same as the distance between the alignment dots 60 of the answer sheet. The pegs are designed so that when they are inserted into the holes 72, they will fit upright and snugly. The alignment and securing rack serves the function of a guide for performing cutting or slitting operations on the template blank 12 and further to secure the answer sheets 10 and to align them with the scoring template 12' to enable checking of answer sheets in rapid succession.

What we claim is:

1. Test scoring apparatus for use in connection with a written test of knowledge containing questions of the true-false type, wherein the person being tested indicates his choice of answer to a question by selectively marking on a paper answer sheet a true or false indicia, questions of the word-matching type wherein the person being tested indicates proper answers by writing on said sheet word-representing indicia which correspond to matched words, questions of the multiple choice type wherein the person being tested indicates proper answers by marking on said sheet indicia which correspond to chosen words, and questions of the word fill-in type wherein the person being tested indicates proper answers by writing on said sheet appropriate words, said apparatus comprising, in combination, an imperforate printed columnar paper answer sheet and a printed columnar grading overlay template blank, said answer sheet being divided into adjacent vertical columns including a first true-false column having printed thereon said true and false indicia, a second matching column having visibly defined localized write-in spaces for receiving said word representing indicia, a third multiple-choice column having a plurality of visibly defined localized spaces for receiving the answer selection indicia, and a fourth fill-in column, said latter column having visibly defined localized write-in spaces for entry of appropriate word answers, said template blank being divided into adjacent vertical columns including first, second and third columns which correspond nearly positionally to said first, second and third columns of the answer sheet, and a fourth column which is divided into a first sub-column which is devoid of write-in spaces and intended to be cut out and which corresponds positionally to said fourth fill-in column of the answer sheet and second sub-column containing write-in spaces which are positionally adjacent to the said fourth fill-in column of the answer sheet, the first template blank column having visibly defined localized punch out areas corresponding positionally to the true-false indicia of said answer sheet first column, the second template blank column having visibly defined localized write-in spaces arranged in a column adjacent a column intended to be cut out in order that the cut out column will correspond positionally to the second matching-word representing indicia column of the answer sheet, the third template blank column having visibly defined localized punch-out areas corresponding positionally to said localized spaces of the third answer sheet column, the fourth template blank column consisting of a first sub-column intended to be cut-out and corresponding positionally to the fourth fill-in column of the answer sheet and a second sub-column containing write-in spaces which are positionally adjacent to said fourth fill-in column of the answer sheet, said template blank being adapted for selective punch-out, cut-out and write-in operations which establish, respectively, sight holes, openings, and areas for written entries to enable ready comparison viewing with entries on the answer sheet when said template is in juxtaposed registry with one of said answer sheets.

2. Test scoring apparatus as set forth in claim 1, wherein said first true-false column of the answer sheet is divided into a first sub-column containing said true-false indicia receiving spaces, a second sub-column having visibly defined localized write-in spaces for receiving appropriate substitute words for said false indicia, and a third sub-column which is devoid of visual definition, and the first template blank column is divided into a first sub-column containing said localized punch out areas of the first template blank column, and a second sub-column which corresponds positionally to the third sub-column of the answer sheet and having visibly defined write-in spaces which correspond dimensionally to the write-in spaces of the second sub-column of the first true-false column of the answer sheet, whereby write-in spaces of the second sub-column of the first true-false column of the answer sheet may be viewed alongside the write-in spaces of the second sub-column of the template blank when the completed overlay template is in effective register with the answer sheet.

3. Test scoring apparatus as set forth in claim 2, wherein the said first sub-column containing the said localized punch-out areas of the first template blank column, and said third template blank column containing said localized punch-out areas are disposed with respect to the vertical side edges of the template blank and with respect to the vertical sides of cut-out portions of the template blank as to permit ready access of a conventional paper punch to the punch-out areas.

4. Test scoring apparatus as set forth in claim 3 wherein the template blank contains vertical slits between respective columns to permit access of a conventional paper punch to the punch-out areas.

5. Test scoring apparatus as claimed in claim 1, wherein said answer sheet and said template blank contains one or more matching alignment holes and said apparatus further consists of an alignment rack consisting of an elongated member adapted to be secured to a surface and containing projecting pins that correspond in position to the matching holes of said answer sheet and template blank for engagement thereof.

* * * * *